(12) United States Patent
Widell et al.

(10) Patent No.: US 8,028,132 B2
(45) Date of Patent: Sep. 27, 2011

(54) COLLISION HANDLING APPARATUS AND METHOD

(75) Inventors: Anders Widell, Huddinge (SE); Per Holmberg, Stockholm (SE); Marcus Dahlström, Säter (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 519 days.

(21) Appl. No.: 10/498,423

(22) PCT Filed: Dec. 12, 2001

(86) PCT No.: PCT/SE01/02741
§ 371 (c)(1),
(2), (4) Date: Oct. 12, 2004

(87) PCT Pub. No.: WO03/054693
PCT Pub. Date: Jul. 3, 2003

(65) Prior Publication Data
US 2005/0055490 A1    Mar. 10, 2005

(51) Int. Cl.
*G06F 12/00* (2006.01)
(52) U.S. Cl. . 711/150; 711/168; 711/207; 711/E12.003; 712/E9.05
(58) Field of Classification Search .................. 711/150, 711/168, 207
See application file for complete search history.

(56) References Cited

U.S. PATENT DOCUMENTS

| | | | | |
|---|---|---|---|---|
| 5,838,943 A | * | 11/1998 | Ramagopal et al. | 712/218 |
| 5,878,409 A | * | 3/1999 | Baru et al. | 707/2 |
| 5,890,008 A | * | 3/1999 | Panwar et al. | 712/15 |
| 6,157,991 A | * | 12/2000 | Arnon | 711/161 |
| 6,167,437 A | * | 12/2000 | Stevens et al. | 709/214 |
| 6,665,708 B1 | * | 12/2003 | Tikekar et al. | 709/215 |
| 2001/0030647 A1 | | 10/2001 | Sowizral et al. | |
| 2002/0016878 A1 | | 2/2002 | Flores | |
| 2002/0066005 A1 | * | 5/2002 | Shibayama et al. | 712/218 |

FOREIGN PATENT DOCUMENTS

| | | |
|---|---|---|
| EP | 0969379 A2 | 5/2000 |
| WO | WO 0029939 A1 | 5/2000 |
| WO | WO 0070450 A1 | 11/2000 |
| WO | WO 0193028 A2 | 12/2001 |

OTHER PUBLICATIONS

Database WPI, Week 200124, Derwent Publications Ltd., London, GB, AN 2001 230792 & JP 2001 03 4489 A (Hitachi Ltd.), Feb. 9, 2001.
Swedish Patent Office, International Search Report dated Aug. 16, 2002 for PCT/SE01/02741.

* cited by examiner

*Primary Examiner* — Kevin Verbrugge
*Assistant Examiner* — Victor Wang

(57) ABSTRACT

The present invention relates to mechanisms for handling and detecting collisions between threads (5, 6, 7) that execute computer program instructions out of program order. According to an embodiment of the present invention each of a plurality of threads (5, 6, 7) are associated with a respective data structure (9, 10, 11) comprising a number of bits (12) that correspond to memory elements ($m_0$, $m_1$, $m_2$, $m_n$) of a shared memory (4). When a thread accesses a memory element in the shared memory, it sets a bit in its associated data structure, which bit corresponds to the accessed memory element. This indicates that the memory element has been accessed by the thread. Collision detection may be carried out after the thread has finished executing by means of comparing the data structure of the thread with the data structures of other threads on which the thread may depend.

37 Claims, 4 Drawing Sheets

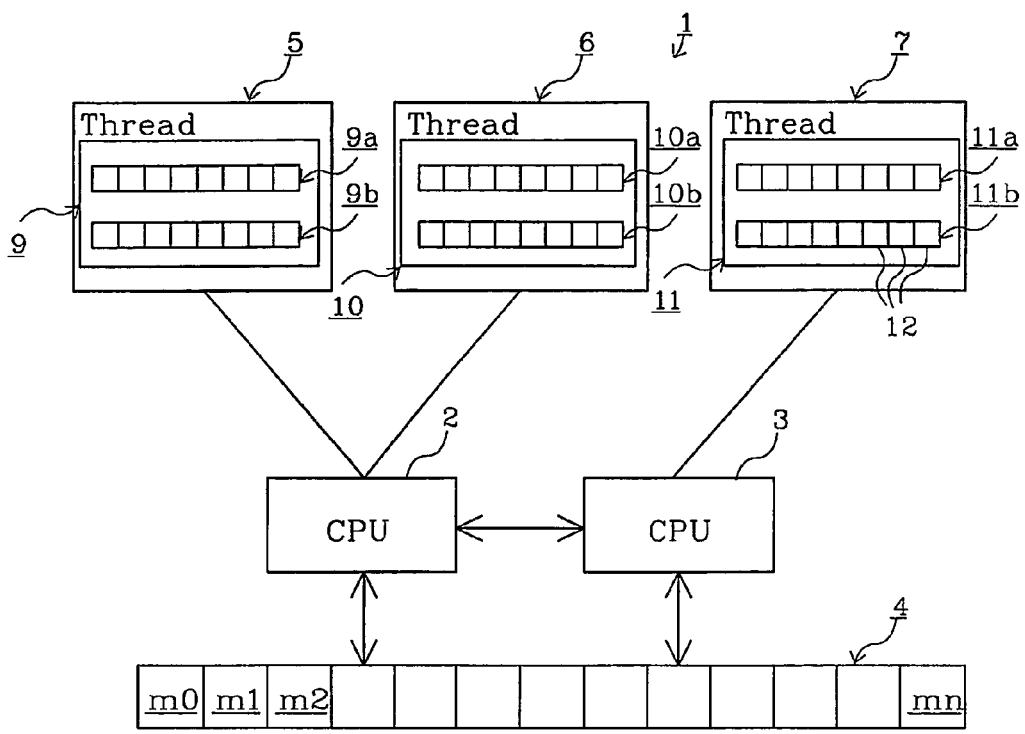
Fig. 1
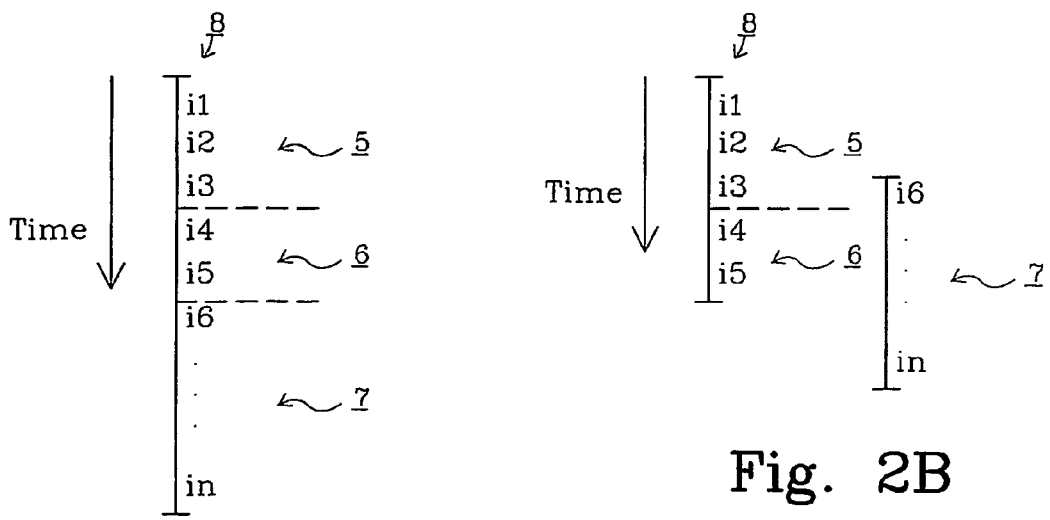
Fig. 2A
Fig. 2B

COLLISION HANDLING APPARATUS AND METHOD

FIELD OF THE INVENTION

The present invention relates in general to execution of computer program instructions, and more specifically to thread-based speculative execution of computer program instructions out of program order.

BACKGROUND OF THE INVENTION

The performance of computer processors has been tremendously enhanced over the years. This has been achieved both by means of making operations faster and by means of increasing the parallelism of the processors, i.e. the ability to execute several operations in parallel. Operations can for instance be made faster by means improving transistors to make them switch faster or optimizing the design to minimize the level of logic needed to implement a given function. Techniques for parallelism include processing computer program instructions concurrently in multiple threads. There are programs that are designed to execute in several concurrent threads, but a program that is designed to execute in a single thread can also be executed in several concurrent threads. If the execution of a program in several concurrent threads causes program instructions to be executed in an order that differs from the program order in which the program was designed to execute the thread execution is speculative. The discussion hereinafter focuses on such speculative thread execution.

A computer program that has been designed to be executed in a single thread can be parallelised by dividing the program flow into multiple threads and speculatively executing these threads concurrently usually on multiple processing units. The international patent application WO00/29939 describes techniques that may be used to divide a program into multiple threads.

However, if the threads access a shared memory, collisions between the concurrently executed threads may occur. A collision is a situation in which the threads access the shared memory in such a way that there is no guarantee that the semantics of the original single-threaded program is preserved.

A collision may occur when two concurrent threads access the same memory element in the shared memory. An example of a collision is when a first thread writes to a memory element and the same memory element has already been read by a second thread which follows the first thread in the program flow of the single-threaded program. If the write operation performed by the first thread changes the data in the memory element, the second thread will read the wrong data, which may give a result of program execution that differs from the result that would have been obtained if the program had been executed in a single thread. Depending on the implementation, collisions can for example also occur when two threads write to the same memory element in the shared memory.

Execution of a computer program in multiple concurrent threads is intended to speed up program execution, without altering the semantics of the program. It is therefore of interest to provide a mechanism for detecting collisions. When a collision has been detected one or more threads can be rolled back in order to make sure that the semantics of the single-threaded program is preserved. A rollback involves restarting a thread at an earlier point in execution, and undoing everything that has been done by the thread after that point. In the example above, in which the older first thread wrote to a memory element that already had been read by the younger second thread, the second thread should be rolled back, at least to the point when the memory element was read, if it is to be guaranteed that the semantics of the single-threaded program is preserved.

A known mechanism for detecting and handling collisions involves keeping track of accesses to memory elements by means of associating two or more flag bits per thread with each memory object. One of these flag bits is used to indicate that the memory object has been read by the thread, and another bit is used to indicated that the memory object has been modified by the thread.

The international patent application WO 00/70450 describes an example of such a known mechanism. Before a primary thread writing to a memory element in a shared memory, status information associated with the memory element is checked to see if a speculative thread has read the memory element. If so, the speculative thread is caused to roll back so that the speculative thread can read the result of the write operation.

A disadvantage of this known mechanism when implemented in software is that it results in a large execution overhead due to the communication and synchronization between the threads that is requited for each access to the shared memory. The status information is accessible to several threads and a locking mechanism is therefore required in order to make sure that errors do not occur due to concurrent access to the same status information by two threads. There is also a need for memory barriers (also called memory fences) in order to ensure correct ordering between accesses to the shared memory and accesses to the status information.

Another example of a known mechanism for detecting and handling collisions is described in Steffan J. G. et al., "The Potential for Using Thread-Level Data Speculation to Facilitate Automatic Parallelization", Proceedings of the Fourth International Symposium on High-Performance Computer Architecture, February 1998, and in Oplinger J. et al., "Software and Hardware for Exploiting Speculative Parallelism with a Multiprocessor", Stanford University Computer Systems Lab Technical Report CSL-TR-97-715, February 1997. An extended cache coherency protocol is used to support speculative threads.

The flag bits are, according to this technique, associated with cache lines in a first level cache of each of a plurality of processors. When a thread performs a write operation, a standard cache coherency protocol invalidates the affected cache line in the other processors. By extending the cache coherency protocol to include the thread number in the invalidation request, the other processors can detect read after write dependence violations and perform rollbacks if necessary. A disadvantage of this approach is that speculatively accessed cache lines have to be kept in the first level cache until the speculative thread has been committed, otherwise the extra information associated with each cache line is lost. If the processor runs out of available positions in the first level cache during execution of the speculative thread, the speculative thread has to be rolled back. Another disadvantage is that the method requires modifications to the cache coherency protocol implemented in hardware, and cannot be implemented purely in software using standard microprocessor components.

SUMMARY OF THE INVENTION

As mentioned above the known mechanisms for handling and detecting collisions have some disadvantages. The problem solved by the present invention is to provide mechanisms that simplify handling and detection of collisions.

A first object of the present invention is to provide a device having simplified mechanisms for recording information regarding memory accesses to a shared memory.

A second object of the present invention is to provide a simplified method for recording information regarding memory accesses to a shared memory.

A third object of the present invention is to provide a simplified method for handling possible collisions between a plurality of threads.

The objects of the present invention are achieved by means of an apparatus according to claim 1, by means of a method according to claim 17 and by means of a method according to claim 27. The objects of the invention are further achieved by means of computer program products according to claim 36 and claim 37.

According to the present invention each of a plurality of threads are associated with a respective data structure for storing information regarding accesses to the memory elements of the shared memory. When a thread accesses a selected memory element in the shared memory, information is stored in its associated data structure, which information is indicative of the access to the selected memory element. According to an embodiment of the present invention collision detection is carried out after the thread has finished executing by means of comparing the data structure of the thread with the data structures of other threads on which the thread may depend.

An advantage of the present invention is that each thread is associated with a respective data structure that stores the information indicative of the accesses to the shared memory. This is especially advantageous in a software implementation since each thread will only modify the data structure with which it is associated. The threads will read the data structures of other threads, but they will only write to their own associated data structure according to the present invention. The need for locking mechanisms is therefore reduced compared with the known solutions discussed above in which the information indicative of memory accesses were associated with the memory elements of the shared memory and were modified by all the threads. The reduced need for locking mechanisms reduces the execution overhead and makes the implementation simpler. In the software implementation, the absence of locks and memory barriers during thread execution will also give a compiler more freedom to optimize the code.

Another advantage of the present invention is that, since it does not require a modified cache coherency protocol, it can be implemented purely in software, thus making it possible to implement the invention using standard components.

Further advantages of embodiments of the present invention will be apparent from the following detailed description of preferred embodiments with reference to accompanying drawings.

BRIEF DESCRIPTION OF THE DRAWINGS

FIG. 1 is a schematic block diagram of a computer system in which the present invention is used.

FIGS. 2A and 2B are schematic diagrams that illustrate a computer program being executed in a single thread and divided into several threads respectively.

DETAILED DESCRIPTION OF SPECIFIC EMBODIMENTS

Figure 3A:
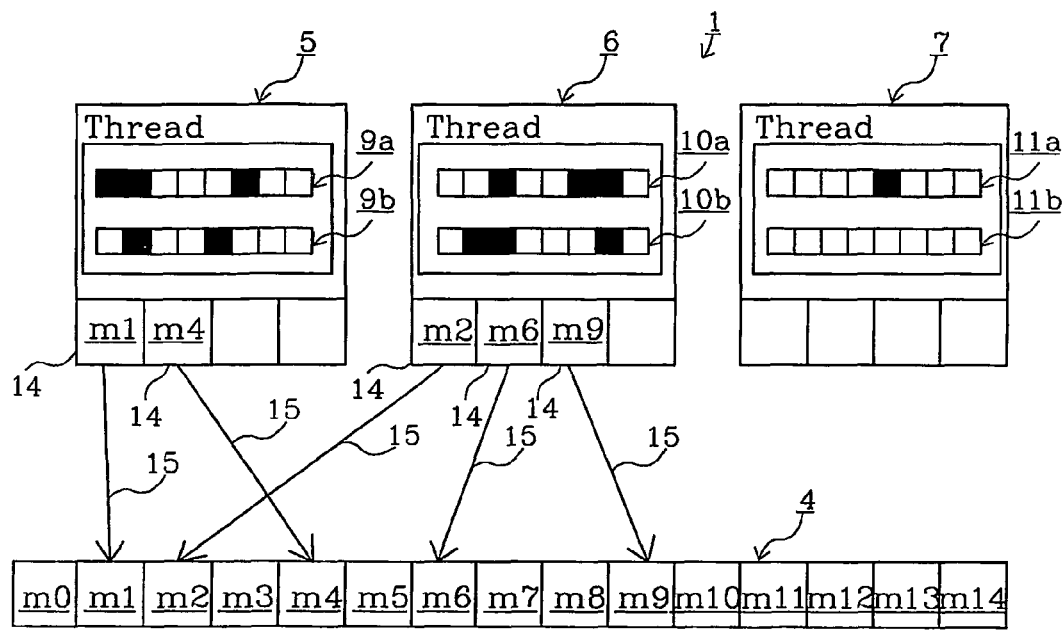
FIG. 3A is schematic block diagram that illustrates how data structures according to the present invention are used.

FIG. 1 illustrates a computer system 1 including two central processing units (CPUs) first CPU 2 and second CPU 3. The CPUs accesses a shared memory 4, divided into a number of memory elements m0, m1, m2, mn. The memory elements may for instance be equal to a cache line or may alternatively correspond to a variable or an object in a source language. FIG. 1 also shows three threads 5, 6, 7 executing on the CPUs 2, 3.

A thread can be seen as a portion of computer program code that is defined by two checkpoints, a start point and an end point. FIG. 2a shows a schematic illustration of a computer program 8 comprising a number of instructions or operations, i1, i2, . . . in. When the computer program is executed as a single thread, the normal way of processing the instructions is in the program order, i.e. from top to bottom in FIG. 2A. It is however possible, according to known techniques as mentioned above, to divide the program into multiple threads. The program 8 may for instance be divided into the three threads 5, 6, 7 as indicated in FIG. 2A. The threads can be executed concurrently. FIG. 2B illustrates an example of a threaded program flow, where the first CPU 2 first processes the thread 5 and then the thread 6, and the second CPU 3 starts processing thread 7 before the threads 5 and 6 have finished executing on the first CPU 2.

FIG. 2B shows an example of how the threads 5, 6, 7 may execute. Many other alternative ways of executing the threads are however possible. It is for instance not necessary that the first CPU 2 finishes processing the thread 5 before starting on the thread 6 and the thread 6 may be executed before the thread 5. The first CPU 2 may be a type of processor that is able to switch between several different threads such that the CPU 2 e.g. starts processing the thread 5, leaves the thread 5 before it is finished to process the thread 6 and then returns to the thread 5 again to continue where it left off Such a processor is sometimes called a Fine Grained Multi-Threading Processor. A Simultaneous Multi-Threading (SMT) Processor is able to process several threads in parallel, so if the CPU 2 is such a processor it is able to process the threads 5, 6 simultaneously.

Thus, it is not necessary to have multiple CPUs in order to process multiple threads concurrently.

Collisions may occur between the threads 5, 6, 7 when the instructions of the computer program 8 are executed out of program order. As mentioned above, a collision is a situation in which the threads access the shared memory 4 in such a way that there is no guarantee that the semantics of the original single-threaded program 8 is preserved. It is therefore of interest to provide mechanisms for detecting and handling collisions that may arise during speculative thread execution.

According to the present invention each thread 5, 6, 7 is associated with a data structure 9, 10, 11, which is illustrated schematically in FIG. 1. The data structure is used to store information indicative of which memory elements in the shared memory 4 that the respective thread has accessed. According to an embodiment of the present invention each data structure includes a number of bits 12 that correspond to the memory elements in the shared memory. According to the embodiment of the present invention shown in FIG. 1 the bits 12 of each data structure 9, 10, 11 are divided into a load vector 9a, 10a, 11a and a store vector 9b, 10b, 11b. For each memory element m0, m1, m2, mn in the shared memory 4, there is exactly one corresponding bit 12 in the load vector and exactly one corresponding bit 12 in the store vector associated with each thread. When the thread 6 reads from a memory element, it sets the corresponding bit 12 in the load vector 9a to indicate that the memory element has been read. The store vector 9b is updated analogously when the thread 6 writes to the shared memory.

There can either be a one-to-one correspondence or a many-to-one correspondence between the memory elements and the bits in the load and store vectors. By having a many-to-one correspondence, the memory overhead is reduced at the cost of spurious collisions, which causes slower execution. Reducing the memory overhead will however also result in reduced execution overhead, since there will be fewer cache misses. A hash function can be used to map a number of a memory element to a bit position in the load and store vectors.

FIG. 3A illustrates an example of how the data structures 9, 10, 11 are used according to the present invention. In this example the thread 5 has written to the memory elements m1 and m4 and read memory elements m1, m5 and m8. The thread 6 has written to the memory elements m2, m6 and m9 and read the memory elements m2, m6 and m13. The thread 7 has read the memory element m12. In this example, there are more memory elements in the shared memory than there are bit positions in the load and store vectors, which means that there is a many-to-one correspondence between the memory elements and the bits in the load and store vectors. In this example the bit position in the load and store vector that corresponds to a selected memory element is found using a hash function, which in this example simply calculates the remainder when dividing the number of the memory element by the size of the load and store vectors. This means that when the thread 5 writes to the memory elements m1, it sets the bit in position number 1 in its store vector and when the thread 6 writes to the memory element m9, it sets the bit in position number 1 in its store vector. When the threads have performed the write and read operations mentioned above, the bit position numbers that are set will be 0, 1, 5 for the load vector 9a; 1, 4 for the store vector 9b; 2, 5, 6 for the load vector 10a; 1, 2, 6 for the store vector 10b and 4 for the load vector 11a. This is illustrated in FIG. 3A by means of filled boxes representing the bits that are set.

Figure 3B:
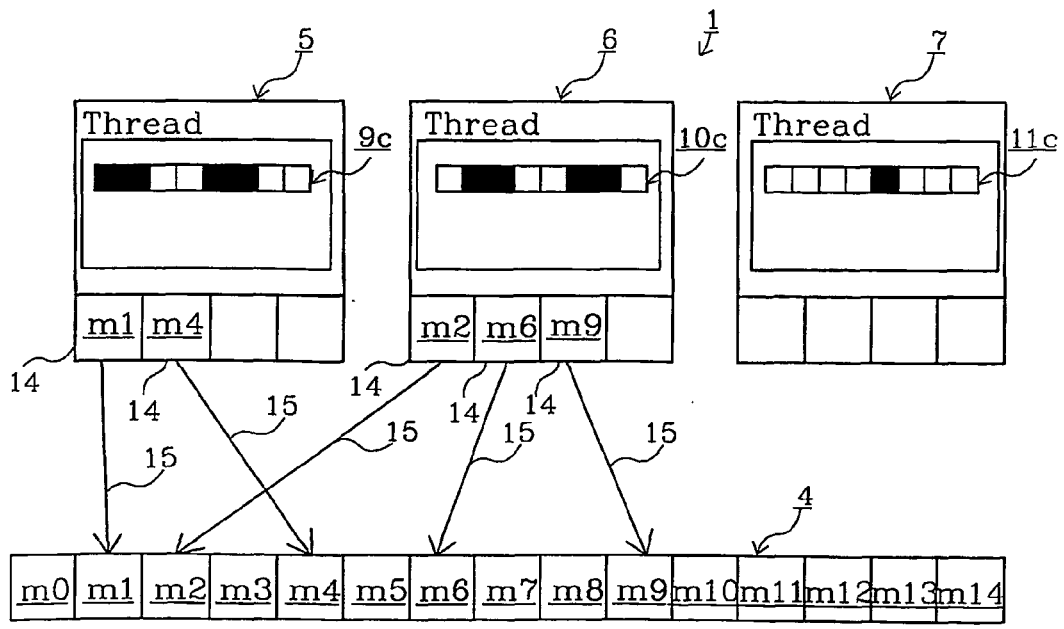
FIG. 3B is schematic block diagram that illustrates how an alternative embodiment of data structures according to the present invention is used.

The implementation of the present invention can be simplified by means of the data structures 9, 10, 11 each comprising a single combined load and store vector instead of a separate load vector and a separate store vector. FIG. 3B illustrates the same example as described above with reference to FIG. 3A, with the only difference that the data structures 9, 10, 11 each includes a single combined load and store vector 9c, 10c, 11c instead of the load vectors 9a, 10a, 11a and the store vectors 9b, 10b, 11b. The bit positions that are set in the combined load and store vector 9c correspond to a logical bitwise inclusive or operation of the load vector 9a and store vectors 9b shown in FIG. 3B.

The embodiment of the present invention wherein the data structures includes a single combined load and store vector results in an increased number of spurious collisions, but on the other hand it also results in a reduced need for memory to store the data structures and a reduced number of operations when checking for collisions, as will be discussed further below.

Figure 4:
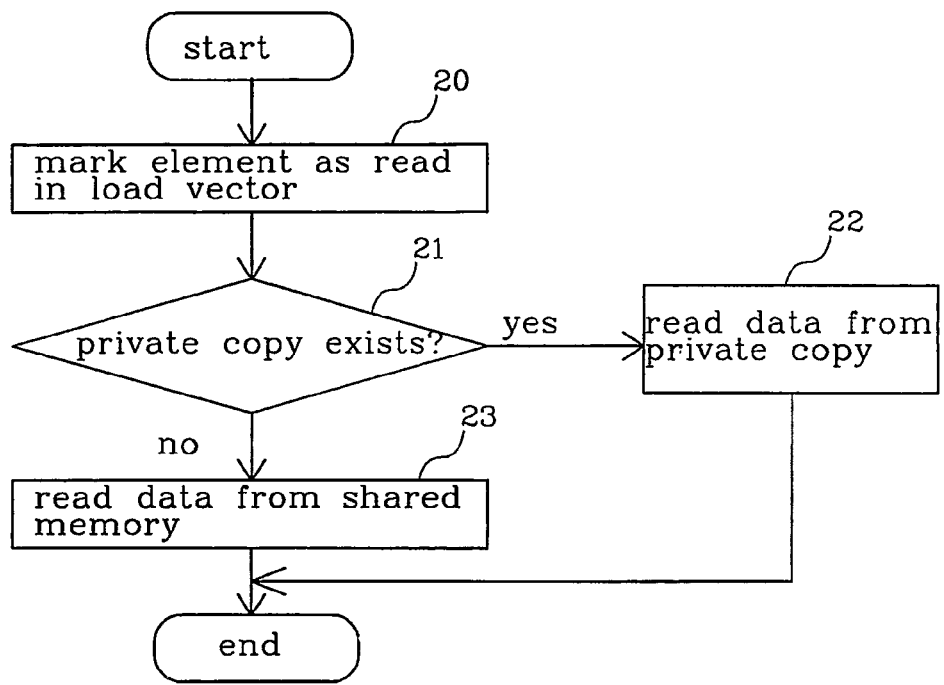
FIG. 4 is a flow diagram illustrating how reading from the shared memory may be performed according to the present invention.
Figure 5:
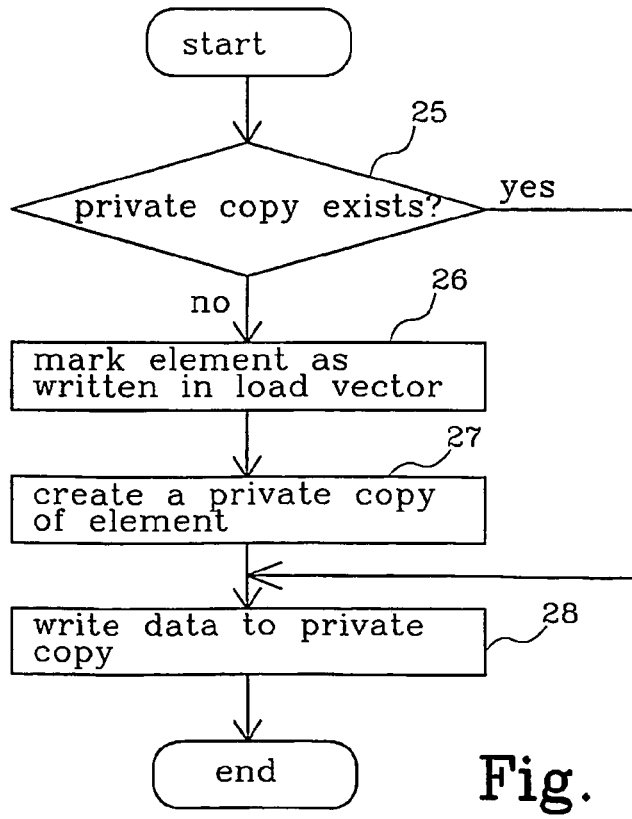
FIG. 5 is a flow diagram illustrating how writing to the shared memory may be performed according to the present invention.

The embodiments of the present invention shown in FIGS. 3A and 3B uses a type of data versioning called privatisation, which means that a private copy 14 of a memory element that is to be modified is created for the thread that modifies the element. The thread then modifies the private copy instead of the original memory element in the shared memory. The private copies contain pointers 15 to their corresponding original memory element in the shared memory. The private copies are used to write over the original memory elements in the shared memory 4 when the threads for which they were created are committed. If a thread is rolled back, its associated private copies 14 are discarded. FIG. 4 shows a flow diagram illustrating how reading from the shared memory is performed when privatisation is used. FIG. 5 shows a corresponding flow diagram for writing to the shared memory.

FIG. 4 shows a first step 20, wherein the memory element to be read is marked as read in the load vector. In step 21, it is examined whether or not the thread has a private copy of the memory element to be read. If a private copy exists the data is read from the private copy, step 22. If there is no private copy the data is read from the memory element in the shared memory, step 23.

FIG. 5 shows a first step 25, wherein it is examined whether or not the thread has a private copy of the memory element to be written to. If there is no private copy, the memory element to be written to is marked as written in the store vector, step 26, and a private copy is created, step 27. The data is then written to the private copy, step 28. If a private copy is found to exist in step 25, the data can be written to the private copy directly, step 28, without having to make a mark in the store-vector or create the private copy.

The privatisation described above is not a prerequisite of the present invention. Another type of data versioning, which may be used instead of privatisation, involves that the threads store backup copies of the memory elements before they modify them. These backup copies are then copied back to the shared memory during a rollback.

The embodiments of the present invention described above comprise data structures in the form of bit vectors for storing information indicative the thread's accesses to the memory. However, many alternative types of data structures for storing this information are possible according to the present invention. The data structures may for instance be implemented as lists to which numbers that correspond to the memory elements are added to indicate accesses the memory elements. Other possible implementations of the data structures include trees, hash tables and other representations of sets.

It will now be discussed how the thread associated data structures of the present invention can be used to check for and detect collisions.

In a software implementation where the thread associated data structures of the present invention are used to check for collisions, a thread that has collided with another thread will itself detect the collision. In the known mechanisms discussed above an older thread would detect if a younger thread has collided and send a message about this so that the younger thread would be rolled back. This sending of messages takes time and causes an extra delay, which can be avoided by means of the present invention.

Figure 6:
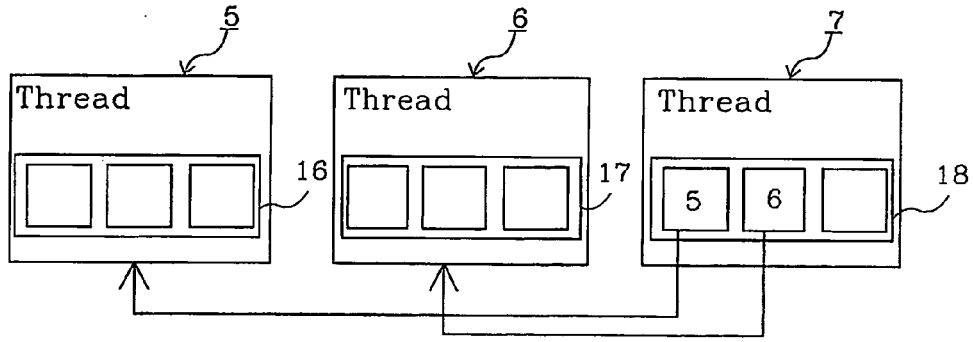
FIG. 6 is a schematic block diagram that illustrates dependence lists associated with threads according to the present invention.

According to a preferred embodiment of the present invention collision checks are performed after the thread has finished its execution and is about to be committed. The collision check is made by means of comparing the data structure associated with the thread to be checked with the data structures associated with other threads on which the thread to be checked may depend. In order to keep track of the possible dependencies between threads a dependence list may be created for each thread before it starts executing. This is illustrated in FIG. 6, by means of the threads 5, 6, 7 which are associated with dependence lists 16, 17 and 18 respectively. The dependence lists are lists of all older threads that had not yet been committed when the thread was about to start executing. The thread 7 may depend on threads 5 and 6 so its dependence list 18 contains references to threads 5 and 6 to indicate the possible dependency.

The dependence list described above is just an example of how to keep track of possible dependencies between threads. The dependence list is not limited to a list structure but can also be represented as an alternative structure that can store information regarding possible dependencies. It is further not necessary for the dependence list to store a reference to all older not yet committed threads. For example in an implementation where forwarding is used it may be possible to determine that the thread to be started is not dependent on some of the older not yet committed threads and it is then not necessary to store a reference to these threads in the dependence list. In other cases the information stored in the dependence list may refer to an interval of threads of which some already have been committed when the dependence list is created. As long as the dependence list includes a reference to all the threads that the thread to be started depends on there is no harm in the dependence list also including references to some threads that the thread to be started clearly does not depend on.

Figure 7:
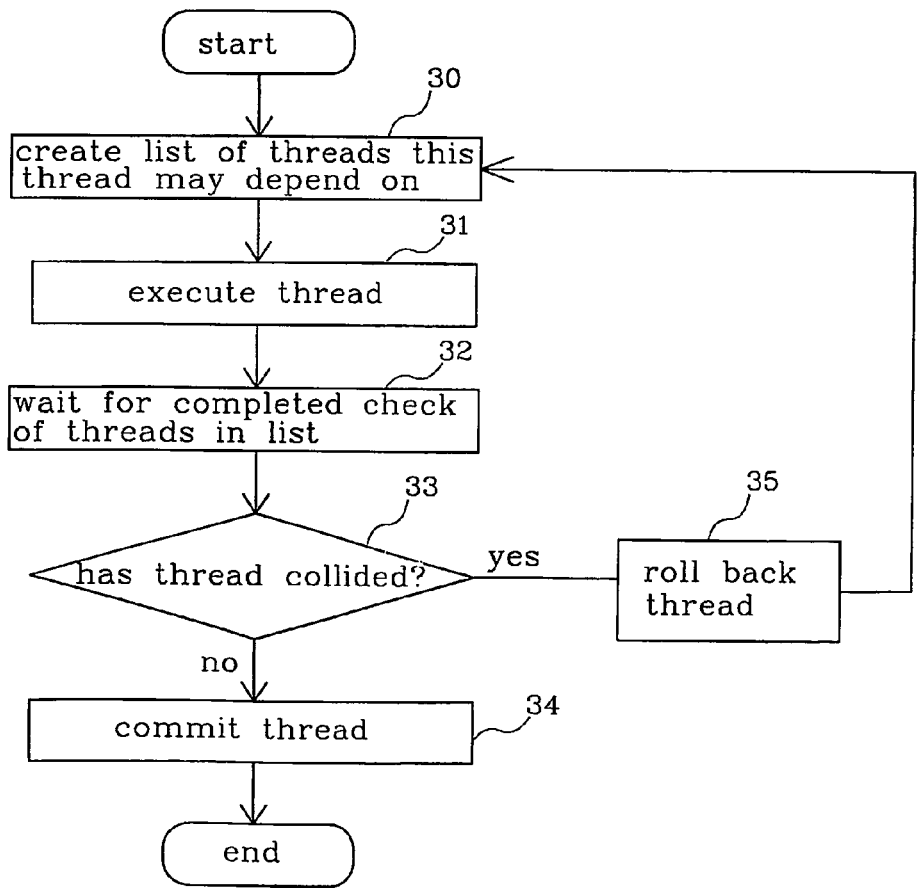
FIG. 7 is a flow diagram illustrating how a thread may be executed and a collision check for the thread may be made according to the present invention.

FIG. 7 shows a flow diagram of how a thread may be executed and a collision check for the thread may be made according to the present invention. In a step 30, the dependence list for the thread to be executed is created. The thread is then executed in a step 31. When the thread has finished executing, it waits until the threads that it may depend on have been checked for collisions and are ready to be committed, step 32. It then compares its associated data structure to the data structures associated with the threads in the dependence list to check for collisions, step 33. If no collision is detected, the thread is committed in a step 34, otherwise the thread is rolled back in a step 35. If the thread has collided with another thread, the risk that the thread collides with the same thread again may be reduced by means of delaying the restart of the thread until the thread it collided with has been committed. The system may be arranged to give higher priority to committing threads with which other threads have collided.

When the collision check is performed as described above, even the oldest not yet committed thread is speculative, since it might have collided with an earlier thread that already has been committed and this is not detected until the thread has finished its execution. However, when a thread has become the oldest not yet committed thread, it will have to be rolled back at the most once, since when it is restarted, there is no other thread that it can collide with.

Alternatively one or several partial collision checks may be performed during execution, before performing the collision check when the thread has finished executing. The partial collision check can be performed without locking the data structures associated with other threads because it is acceptable that the partial check fails to detect some collisions. Collisions that were not detected in the partial collision check will be detected in the final collision check that is performed after the thread has finished its execution.

The comparison between two data structures to detect collisions is performed differently depending on whether or not the data structures includes separated load and store vectors or a combined load and store vector. If the data structures have separated load and store vectors the comparison between the load and store vectors of an older and a younger thread can be carried out by means of performing the following logical operations bitwise on the bit vectors: old store vector AND (young store vector OR young load vector).

If the resulting vector contains any bits that are set there is a collision and the younger thread should be rolled back. If the data structures have combined load and store vectors the corresponding logical operation to be performed to check for collisions is an AND-operation between the combined vector of the older thread and the combined vector of the younger thread.

In an alternative embodiment the comparison to detect collisions is carried out by means of performing the following logical operation bitwise on the bit vectors: old store vector AND young load vector.

This comparison assumes that the threads are committed in program order and that when a write operation that only modifies part of a memory element (which corresponds to a read-modify-write operation) is carried out the corresponding bit in both the load and the store vector is set.

An advantage of the collision check of the present invention is that since collisions do not have to be detected until the thread has finished executing, there is no need for any locking mechanism or memory barriers during execution. This reduces the execution overhead and makes the implementation simpler. Another reason why the execution overhead can be reduced according to the present invention is that if the collision check is only performed when the thread has finished executing, at most one check will have to be made for each accessed memory element, even if the element has been accessed many times during execution. In the known mechanisms discussed above a collision check was performed in connection with each access to the shared memory.

The cost of handling collisions according to the present invention is that collisions are not detected as early as possible, which results in some wasted data processing of threads that already have collided and should be rolled back. However, the gain in execution overhead will in many cases surpass the cost of not detecting collisions immediately. The collision check of the present invention described above is thus particularly favorable when collisions are rare.

According to the present invention, the only thing that has to be performed in the same order as in the original single-threaded program is the collision check. Threads can be executed and rolled back out of program order and depending on the implementation sometimes also committed out of program order.

If the many-to-one correspondence between the memory elements and the bits in the load and store vectors is used, the load and store vectors can have a fixed size. The memory overhead is then proportional to the number of threads instead of the number of memory elements, which means that the amount of memory needed to store the data structures will remain the same when the number of memory elements in the shared memory increases.

The present invention can be implemented both in hardware and in software. In a hardware implementation it is possible to use a fast fixed-size memory inside each processor to store the data structures. In a software implementation a speed advantage will be obtained if the data structures are made small enough to be stored in the first level cache of the processor. Due to the frequent use of the data structures it will be advantageous to store them in as fast memory as possible.

The data structure associated with a thread will naturally only have to be stored in memory until the thread with which it is associated and all threads that may depend on the thread are committed. Once the thread and all threads that may depend on it ate committed the memory used to store its associated data structure can be reused.

The present invention is not limited to any particular type of memory elements of a shared memory. The present invention is applicable to both logical and physical memory elements. Logical memory elements are for example variables, vectors, structures and objects in an object oriented language. Physical memory elements are for example bytes, words, cache lines, memory pages and memory segments.

As described above a thread comprises a number of program instructions. Other terms for a series of instructions that are sometimes used in the field. An example of such a term is job.

Thread-level speculative execution with a shared memory has many similarities to a database transaction system. The entries of a database can be compared with the elements of a shared memory and since a database transaction includes a number of operations, a database transaction can be compared with a thread. One way to ensure that a database remains consistent is to check for collisions between different database transactions. Thus the principles of the ideas of the present invention may be used also in this field.

It is to be understood that the embodiments of the present invention discussed above and illustrated in the figures, merely serves as examples to illustrate the ideas of the present invention and that the invention in no way is limited to just the examples described. The examples are for instance simple examples that only illustrate a few memory elements in the shared memory and a few bits in the data structures associated with the threads. In reality the number of memory elements and bits can be very large. The present invention is further not limited to any particular number of threads or CPUs.

The invention claimed is:

1. An apparatus for supporting speculative execution of a plurality of speculative threads, the threads comprising computer program instructions, said apparatus comprising:
a shared memory comprising a number of shared memory elements;
one or more processors for executing the speculative threads, wherein during execution of the threads, the one or more processors access selected shared memory elements in the shared memory, and each time a processor executes one of the speculative threads, a software data structure is created corresponding to the speculative thread the processor is executing, each software data structure indicating which of the shared memory elements the processor accessed while executing the data structure's corresponding speculative thread, wherein each software data structure has a one-to-one relation with a corresponding speculative thread allowing only information relating to execution of the corresponding speculative thread to be stored in the data structure; and
processing means for detecting collisions between threads by comparing the data structure of a given speculative thread with the data structures corresponding to other speculative threads on which the given speculative thread depends, wherein the comparing occurs serially after the given speculative thread and the other speculative threads on which the given speculative thread depends have finished executing their computer program instructions and prior to being committed.

2. The apparatus according to claim 1, wherein the software data structures are one of the following types of structures: an unsorted list, a sorted list, a tree, and a table.

3. The apparatus according to claim 1, wherein each software data structure comprises a number of bits that, when set, indicate shared memory elements of the shared memory, and the apparatus also includes means for setting at least one chosen bit corresponding to an accessed shared memory element.

4. The apparatus according to claim 3, wherein each software data structure comprises a load vector and a store vector, wherein the means for setting at least one chosen bit is arranged to set a bit in the load vector when the given thread accesses the accessed shared memory element in order to read it, and wherein the means for setting at least one chosen bit is arranged to set a bit in the store vector when the given thread accesses the accessed shared memory element in order to write to it.

5. The apparatus according to claim 4, wherein there is a one-to-one correspondence between the shared memory elements in the shared memory and the bits in the, or each, vector of the software data structure.

6. The apparatus according to claim 4, wherein there is a many-to-one correspondence between the shared memory elements in the shared memory and the bits in the, or each, vector of the software data structure.

7. The apparatus according to claim 6, wherein the correspondence between the bits in the, or each, vector and the shared memory elements is determined by a hash function that maps the shared memory elements to the bits in the, or each, vector.

8. The apparatus according to claim 3, wherein each software data structure comprises a single combined load and store vector.

9. The apparatus according to claim 1, further comprising means for creating a dependence list associated with the given thread before execution of the given thread, said dependence list including a reference to each other thread which has not yet been committed and which comes before the given thread in program order.

10. The apparatus according to claim 1, further comprising:
means for committing the given thread if no collision is detected between the given thread and any of the other threads on which the given thread may depend; and
means for restarting execution of the given thread if a collision is detected between the given thread and any of the other threads on which the given thread may depend.

11. The apparatus according to claim 10, further comprising means for delaying a restart of execution of the given thread until the other thread, or each of the other threads, with which the first thread has collided has been committed.

12. The apparatus according to claim 11, further comprising means for giving priority to committing and/or executing the other thread, or each of the other threads, with which the given thread has collided.

13. The apparatus according to claim 1, further comprising means for performing a partial check for collisions between the given thread and at least one of the other threads on which the given thread may depend, said means for performing a partial check including means for comparing the data structure associated with the given thread with the respective data structure associated with the at least one of the other threads on which the given thread may depend.

14. The apparatus according to claim 1, wherein the processors include:

means for creating a private copy of any shared memory element that is to be modified during execution of the given speculative thread, wherein the private copy has a one-to-one relation with the given speculative thread; and means for modifying the private copy during execution of the given speculative thread, wherein upon the given thread being committed, the processor overwrites the shared memory element with the modified private copy; and wherein upon the given thread being rolled back, the processor discards the modified private copy.

15. The apparatus according to claim 1, wherein the processors include:

means for creating a copy of a pre-existing shared memory element that is to be modified during execution of the given speculative thread; and means for modifying the shared memory element in the shared memory during execution of the given speculative thread;

wherein upon the given thread being committed, the processor discards the copy of the pre-existing shared memory element; and wherein upon the given thread being rolled back, the processor overwrites the modified shared memory element with the copy of the pre-existing shared memory element.

16. The apparatus according to claim 1, wherein when a first processor begins execution of a given speculative thread and then stops, and a second processor resumes execution of the speculative thread, both the first and second processors write to the same software data structure corresponding to the given speculative thread.

17. A method of supporting speculative execution of a plurality of speculative threads, the threads comprising computer program instructions, said method comprising the steps of:

executing the speculative threads by one or more processors, the executing step including:

accessing by the one or more processors, selected shared memory elements in a shared memory;

creating by each processor, each time the processor executes one of the speculative threads, a software data structure corresponding to the speculative thread the processor is executing, each software data structure indicating which of the shared memory elements the processor accessed while executing the data structure's corresponding speculative thread, wherein each software data structure has a one-to-one relation with a corresponding speculative thread allowing only information relating to execution of the corresponding speculative thread to be stored in the data structure; and detecting collisions between threads when a given speculative thread and other speculative threads on which the given speculative thread depends have finished executing their computer program instructions, said detecting step including comparing by a comparing processor, the data structure of the given speculative thread with the data structures corresponding to the other speculative threads on which the given speculative thread depends, wherein the comparing occurs serially after the speculative threads have been executed and prior to being committed.

18. The method according to claim 17, wherein each software data structure is one of the following types of structures: an unsorted list, a sorted list, a tree, and a table.

19. The method according to claim 17, wherein each software data structure comprises a number of bits that, when set, indicate shared memory elements of the shared memory, and wherein the step of creating a software data structure includes setting a chosen bit in the data structure corresponding to the accessed shared memory element.

20. The method according to claim 19, wherein each software data structure comprises a load vector and a store vector, wherein the step of setting the chosen bit includes setting a bit in the load vector when the given thread accesses a selected shared memory element in order to read it, and wherein the step of setting the chosen bit includes setting a bit in the store vector when the given thread accesses the selected shared memory element in order to write to it.

21. The method according to claim 20, wherein there is a one-to-one correspondence between the shared memory elements in the shared memory and the bits in the, or each, vector of the software data structure.

22. The method according to claim 20, wherein there is a many-to-one correspondence between the shared memory elements in the shared memory and the bits in the, or each, vector of the software data structure.

23. The method according to claim 22, wherein the correspondence between the bits in the, or each, vector and the shared memory elements is determined by means of mapping the memory elements to the bits in the, or each, vector using a hash function.

24. The method according to claim 19, wherein the software data structure comprises a single combined load and store vector.

25. The method according to claim 17, further comprising the steps of:

creating by the processor executing the given speculative thread, a private copy of any shared memory element that is to be modified during execution of the given speculative thread, wherein the private copy has a one-to-one relation with the given speculative thread;

modifying by the processor, the private copy during execution of the given speculative thread;

upon the given thread being committed, overwriting by the processor, the shared memory element with the modified private copy; and upon the given thread being rolled back, discarding by the processor, the modified private copy.

26. The method according to claim 17, further comprising the steps of:

creating by the processor executing the given speculative thread, a copy of a pre-existing shared memory element that is to be modified during execution of the given speculative thread;

modifying by the processor, the shared memory element in the shared memory during execution of the given speculative thread;

upon the given thread being committed, discarding by the processor, the copy of the pre-existing shared memory element; and upon the given thread being rolled back, overwriting by the processor, the modified shared memory element with the copy of the pre-existing shared memory element.

27. A method for handling possible collisions between a plurality of speculative threads, said speculative threads comprising computer program instructions to be executed by one or more processors by accessing shared memory elements of a shared memory, said method comprising the steps of:

executing by the one or more processors, a first speculative thread and speculative threads upon which the first speculative thread depends;

creating by the one or more processors, a plurality of software data structures that store information indicating which shared memory elements were read or modified during execution of the threads, wherein each time one of the speculative threads is executed, the processor executing the speculative thread stores the information in a corresponding separate data structure having a one-to-one relation with the speculative thread being executed, the data structure allowing only information relating to execution of the corresponding speculative thread to be stored in the data structure;

when the first speculative thread is ready to be committed, determining by a comparing processor whether each of the speculative threads upon which the first speculative thread depends is ready to be committed;

if each of the speculative threads upon which the first speculative thread depends is not ready to be committed, waiting by the comparing processor until each of the speculative threads upon which the first speculative thread depends is ready to be committed; and when each of the speculative threads upon which the first speculative thread depends is ready to be committed, checking for a collision between the first speculative thread and each of the speculative threads upon which the first speculative thread depends by comparing by the comparing processor, the first speculative thread's corresponding software data structure with software data structures corresponding to the speculative threads upon which the first thread depends, wherein the comparing step occurs serially after the first speculative thread has finished executing its computer program instructions and prior to being committed.

28. The method according to claim 27, wherein each software data structure includes a number of bits that, when set, indicate shared memory elements of the shared memory, and wherein a bit is set if the shared memory element to which the bit corresponds has been accessed by the thread with which the software data structure is associated during execution of the thread.

29. The method according to claim 28, wherein each software data structure includes a load vector and a store vector, wherein a bit in the load vector is set if the memory element to which the bit corresponds has been read by the thread with which the data structure is associated during execution of the thread, and wherein a bit in the store vector is set if the memory element to which the bit corresponds has been written to by the thread with which the data structure is associated during execution of the thread.

30. The method according to claim 28, wherein each software data structure comprises a single combined load and store vector.

31. The method according to claim 27, further comprising creating a dependence list associated with the first thread before execution of the first thread, said dependence list including a reference to each thread which has not yet been committed and which comes before the first thread in program order.

32. The method according to claim 27, wherein the first thread is committed if no collision is detected, and wherein the execution of the first thread is restarted if a collision is detected.

33. The method according to claim 32, wherein the restart of execution of the first thread is delayed until the thread, or each of the threads, with which the first thread collided has been committed.

34. The method according to claim 33, wherein priority is given to committing and/or executing the thread, or each of the threads, with which the first thread collided.

35. The method according to claim 27, further comprising performing a partial check for collisions between the first thread and at least one of the threads upon which the first thread depends by comparing by the comparing processor, the software data structure associated with the first thread with the respective software data structure associated with the at least one of the threads upon which the first thread depends, wherein no locking of the data structures takes place while the partial check is performed.

36. The method according to claim 27, further comprising the steps of:
creating by the processor executing the first speculative thread, a private copy of any shared memory element that is to be modified during execution of the first speculative thread, wherein the private copy has a one-to-one relation with the first speculative thread;
modifying by the processor, the private copy during execution of the first speculative thread;
upon the first thread being committed, overwriting by the processor, the shared memory element with the modified private copy; and
upon the first thread being rolled back, discarding by the processor, the modified private copy.

37. The method according to claim 27, further comprising the steps of:
creating by the processor executing the first speculative thread, a copy of a pre-existing shared memory element that is to be modified during execution of the first speculative thread;
modifying by the processor, the shared memory element in the shared memory during execution of the first speculative thread;
upon the first thread being committed, discarding by the processor, the copy of the pre-existing shared memory element; and
upon the first thread being rolled back, overwriting by the processor, the modified shared memory element with the copy of the pre-existing shared memory element.

* * * * *

UNITED STATES PATENT AND TRADEMARK OFFICE
CERTIFICATE OF CORRECTION

| | |
|---|---|
| PATENT NO. | : 8,028,132 B2 |
| APPLICATION NO. | : 10/498423 |
| DATED | : September 27, 2011 |
| INVENTOR(S) | : Widell et al. |

It is certified that error appears in the above-identified patent and that said Letters Patent is hereby corrected as shown below:

On the Face Page, in Field (56), under "OTHER PUBLICATIONS", in Column 2, Line 2, delete "GB," and insert -- GB, Class T01, --, therefor.

In Column 2, Line 25, delete "requited" and insert -- required --, therefor.

In Column 9, Line 10, delete "ate" and insert -- are --, therefor.

In Column 11, Line 9, in Claim 14, delete "thread," and insert -- thread; --, therefor.

Signed and Sealed this
Fourteenth Day of February, 2012

David J. Kappos
*Director of the United States Patent and Trademark Office*